INVENTORS
Lincoln Henthorn
Edward W. Thomas
Robert A. Boie
BY Delio and Montgomery
ATTORNEYS

INVENTORS
Lincoln Henthorn
Edward W. Thomas
Robert A. Boie
BY Delio and Montgomery
ATTORNEYS

United States Patent Office 3,320,419
Patented May 16, 1967

3,320,419
LIQUID SCINTILLATION COUNTING SYSTEM FOR THE MEASUREMENT OF SOFT BETA ACTIVITY
Edward W. Thomas and Lincoln Henthorn, Cheshire, and Robert A. Boie, Wilton, Conn., assignors to Ans, Inc., Wallingford, Conn., a corporation of Connecticut
Filed Mar. 18, 1965, Ser. No. 440,832
16 Claims. (Cl. 250—71.5)

This invention relates to radio-activity measurement systems and, more particularly, to scintillation spectrometry systems for the measurement of soft beta activity emitted from radio-active material and for the measurement of other radio-active radiation as, for example, gamma or alpha radiation Soft beta counting or measurements have become important as a tool in the bio-medical field and in the chemical field. Beta counting has gained prominence in the recently discovered field of carbon dating. Radio-active material, such as unstable isotopes of hydrogen, tritium $H^3$, carbon $C^{14}$, or phosphorous $P^{32}$, have been added as a trace element to various materials or substances undergoing tests as, for example, in chemotherapy tests in the bio-medical field. Further, radio-active material such as the above, has been added to various chemicals prior to their reacting, so that the flow rate of the material and the speed of reaction of the chemicals can be determined by taking samples at different times during the process.

In recent years, liquid scintillation counting has replaced geiger and proportional counting as the preferred choice for the measurement of soft beta activity. Reasons for this are several. Liquid scintillation counting efficiencies are generally higher and backgrounds lower. Of even more importance, its the ease of sample preparation for liquid scintillation counting and also the ability to measure, within the same sample, two or more isotopes simultaneously (known as dual label experiment), something completely impracticable to achieve by any other means, especially where many samples are involved.

Briefly, the liquid scintillation process can be described as one where a beta decay event occurs followed by energy transfer through the liquid solution to the scintillator which, in turn, emits light. Further, a secondary scintillator may be present to absorb these primary emissions and re-emit at a longer wave length. In order to record or depict the presence of soft beta decay, usually a sample carrying traces of radio-active isotopes to be measured is dissolved or suspended in a solvent system which has been selected for its capability of absorbing and transmitting energy originating from beta decay events without attenuating that energy significantly. Aromatic hydrocarbons such as toluene, benzene or xylene are solvents of general choice. When, because of the material being examined, these solvents are not suitable, other non-polar solvents such as dioxane, dimethaxyethane, or methyl Cellosolve are generally used. In such cases, an aromatic hydrocarbon, most usually naphthalene, is added to improve energy transfer. The solvent also contains the scintillator, a material which, when activated by the beta decay energy transmitted through the solvent, gives rise to light scintillations. The two most prominent scintillators today of importance for routine liquid scintillation counting, are p-terphenyl and 2,5-diphenyloxazolyl (PPO).

The scintillations arising from a typical beta decay event have a duration of but a few nanoseconds. With either P-terphenyl or PPO alone, the wave length of this emitted light covers a spectral region where the photomultipliers which are generally used for light detection are not maximumly sensitive. Therefore, a secondary scintillator, occasionally termed a "wave length shifter" is added to the same solution. This material, which is likely to be 1,4 - bis - 2 - (5 - phenyloxazolyl) - benzene (POPOP) or 1,4-bis-2-(4-methyl-5-phenyloxazolyl)-benzene (dimethyl POPOP) is added in trace quantity and is capable of absorbing the energy transmitted by the primary scintillator and re-emitting at a longer wave length where the usual photomultiplier is more sensitive.

The total amount of light available from an individual decay event is approximately seven photons per kev. Thus, a maximum energy $H^3$ event ($E_{max.}=18$ kev.) gives rise to less than 140 photons while an event of mean energy ($E=5.6$ kev.) gives rise to less than 40 photos. For $C^{14}$, the maximum energy events (156 kev.) give rise to about 1,000 photons and events of mean energy generate approximately 400 photons. The most energetic isotope commonly encountered in bio-medical research is generally $P^{32}$. With an $E_{max.}$ of 1710 kev., the most energetic $P^{32}$ event will give rise to 12,000 photons.

The early liquid scintillation measuring systems utilized a single photomultiplier having a number of multiplier dynode plates for the purposes of multiplying the light received from the scintillation fluid. The output from the multiplier was then amplified and analyzed in a pulse height analyzer, which was biased such that it would provide an output signal for an input signal of certain predetermined levels . The number of pulses from the output of the analyzer was then fed to a scaler and/or counting device wherein the number of radiations per time interval was arithmetically determined. Due to the inherent noise produced in the photomultiplier tube itself, accurate measurements were not obtainable for low level beta radiations.

Liquid scintillation counting did not become a practical means for low level beta determination until the introduction of the first coincident counters. In these devices a sample is examined by two photomultipliers. Only if both tubes produce an output pulse within the coincident resolving time is the pulse considered to arise from a legitimate decay event. The pulse arising from one photomultiplier not matched within the coincident resolving time by a pulse in the other, was rejected as being phototube noise and was not counted.

Among the earliest of the coincident type liquid scintillation counters available was the unsymmetrical dual channel type, wherein the amplified output of one of the two photomultipliers was subjected to pulse height analysis while the amplified output of the second phototube served merely to confirm whether or not the output of the first was a result of a legitimate event. Unsymmetrical systems have performance limitations as a result of their logic. Should light distribution between the two photomultipliers be perfectly equal, pulse height analysis should give an accurate reflection of the energy distribution of the decay events being observed. However, as is in fact often the case, when light distribution is unequal, resolution of the system is greatly impaired. On those occasions when the analyzer receives a disproportionate amount of light, the pulse at the anode appears excessively large and in a dual label experiment a high energy tritium event may seem to be a low energy $C^{14}$ event. Conversely, when the analyzer receives less light than it should, a low energy $H^3$ event may not be counted or, in the same dual label experiment, a 25 kev. $C^{14}$ event may fall in the $H^3$ counting channel.

A recent improvement of the unsymmetrical system has been the symmetrical system introduced in 1963. With this device, the output of the two photomultipliers is summed prior to amplification and pulse height analysis. Pulse summation minimizes the loss of resolution due to unequal light distribution, thereby considerably improving double isotope separation. In the system introduced in 1963, coincidence is made after pulse height analysis and a separate coincident circuit is required for each channel of pulse height analysis. Thus, both the unsymmetrical system and the symmetrical system introduced in 1963 have one limitation in common, namely that the pulse height analyzers must examine not only legitimate coincidences but also non-coincident pulses arising from photomultipliers and systems noises. Because of this fact, fast recovery pulse height analyzers are employed to minimize dead time losses or recovery losses. Even so, if more than moderate levels of activity are being examined, significant count loss may be observed despite the use of extremely fast amplifiers and scalers since the pulse height analyzers limit the performance of the system. Further, the prior art systems also utilized in each of their pulse height analyzer channels separate linear amplifiers prior to the pulse height analyzer. With the utilization of isotopes of wide ranges as, for example, $H^3$ to $P^{32}$ and corresponding different extremes in energy levels of the signals produced by the radiations emitted from these isotopes, oft-times the linear amplifiers utilized were overloaded, especially in situations wherein two isotopes such as $H^3$ and $P^{32}$ were combined in a single sample.

In early dual label experiment instrument designs having two channels employing a single linear amplifier common to both channels, overall amplification was adjusted by varying the high voltage to examine the less energetic isotope at balance point in one channel. Decay events from the more energetic isotope caused amplifier overload, thereby preventing accurate pulse height analysis. More recently, linear amplifiers preceded by separate adjustable attenuators have been inserted in each channel, channel gain is individually adjusted allowing differential counting in all channels. Though this technique resulted in improved performance, its incorporation in the counting systems has created new problems. The problem of linear amplifier overload, though lessened, still remains. Whenever an energetic event occurs, overload will still occur in the channel operated at higher gain to examine the less energetic isotope. Should a low energy event occur before the amplifier has recovered from overload, is is not counted. This difficulty is partially overcome with fast recovery amplifiers. However, at high count rates, even with these amplifiers, count loss is evident.

Further, duplication or triplication of amplifiers and attenuators has multiplied the number of operating controls, thereby increasing the complexity of operation. Also, it is difficult to achieve reproduceable settings when using considerable attenuation for energetic isotopes.

Accordingly, a new liquid scintillation system was required to measure beta decay events from both exceedingly low and high energy level isotopes. To accomplish this and provide a new and improved system, applicants have invented a system which utilizes logarithmic amplification enabling the use of a single amplifier in a dual label experiment system. Further, an additional feature of this invention utilizes coincident logic to permit only those signals which are legitimate decay events to be analyzed by each pulse height analyzer.

By the utilization of these inventive techniques, slower and more precise pulse height analyzers may be used since only legitimate coincidences need be examined. Additionally, dual isotope analysis is now possible without the requirement of separate amplifiers or separate attenuators for each pulse height analysis channel.

In view of the foregoing, an object of this invention is to provide a new and improved radio-activity measurement system.

Another object of this invention is to provide a new and improved liquid scintillation counting system for the measurement of soft beta activity.

Another object of this invention is to provide a new and improved liquid scintillation system providing for an accurate measurement of beta decay events.

A further object of this invention is to provide new and improved liquid scintillation systems to simultaneously measure beta decay events from both exceedingly low and high energy level isotopes.

A still further object of this invention is to provide a new and improved scintillation counting system which permits only those signals which are legitimate decay events to be analyzed by each pulse height analyzer of the system.

Still other objects of the invention will in part be obvious and will in part appear hereinafter.

In accordance with this invention, a scintillation system, including means for amplifying signals representative of energy decay events by different amounts according to their respective energy levels, is provided. Further in accordance with this invention, a scintillation system including means for permitting system pulse height analyzers to analyze only legitimate decay events is provided.

In the preferred embodiment of this invention, a beta decay event emanating from a radio-active source is first converted into light energy and then into electrical pulses or signals proportional to the amplitude of the energy of the corresponding decay events. These electrical signals are then amplified by a non-linear amplifier, such as a logarithmic amplifier which differentially amplifies each of the electrical signals in accordance with a predetermined gain characteristic such that for over at least a portion of its amplification characteristic the greater the amplitude of the input signal the smaller the amplification of the input signal.

The invention accordingly comprises the features of construction, combinations of elements and arrangements of devices which will be exemplified in the system arrangements hereinafter set forth and the scope of the invention will be indicated in the claims.

For a fuller understanding of the nature and objects of the invention, reference should be had to the following detailed description, taken in conjunction with the accompanying drawings, in which.

Figure 1:
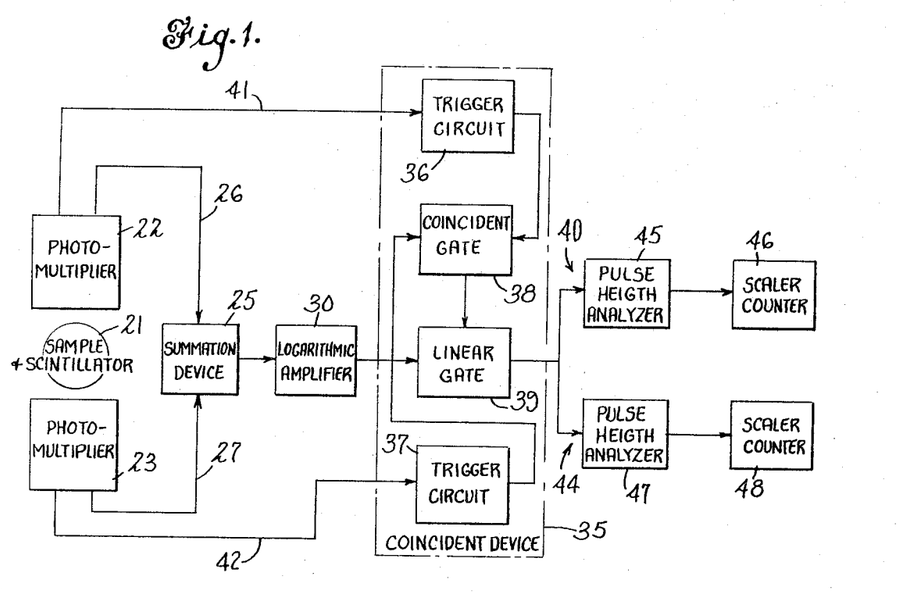
FIG. 1 is a block diagram of a liquid scintillation system according to this invention.

Referring now to FIG. 1, there is disclosed a liquid scintillation counting or measuring system according to this invention. The system shown in this figure is utilized to measure beta decay events which have been converted to light events so as to provide an indication of the type of radio-active isotope contained generally as a trace element in a sample. The sample and the scintillator are generally shown at 21. Generally speaking, a sample containing traces of possibly tritium $H^3$ and phosphorous $P^{32}$, both of which are radio-active unstable isotopes, is dissolved in a solvent which also contains a scintillator material which is also dissolved therein. Frequently, as noted in the introduction, a secondary scintillator is also dissolved therein to convert the initial light generated by the production of protons to light of a wave length to which the phototubes utilized are more sensitive. In the context of this invention, light as used herein is broad enough to cover electromagnetic energy in general as, for example, light in the visible range, infrared, ultraviolet, etc. The sample and the scintillator are generally held in a container such as, for example, glass, plastic or quartz, which is transparent to light. Positioned adjacent to the sample and scintillator 21 are two phototubes 21 are two phototubes 22 and 23. Generally and preferanbly, the two phototube faces are positioned opposite each other. The photomultiplier tubes may be of the box and grid, Venetian blind, focus structure, or any of the other types. Photomultiplier tube type versions, particularly of the Venetian blind type, are available with 10, 11 and 13 or more dynodes with both glass and quartz faces. The combination of the photomultiplier tubes and the sample and scintillator are generally encased in a light-tight compartment, such that any outside light will not interfere with the detection of light by the tubes from events occurring in the sample. Generally the sample and the scintillator are lowered into a light-tight chamber with an elevator and shutter arrangement so as to prevent any outside light from entering and being received by the photomultiplier tubes. It is further possible that semiconductor photocells or other radio-active energy conversion devices could be utilized.

The photons received by both photomultiplier tubes 22 and 23, as a result of a beta decay event photon conversion, are provided via lines 26 and 27 to a pulse summation device 25. In the preferred embodiment, the twelfth dynode of each photomultiplier tube is coupled via lines 26 and 27 to the pulse summation device 25. The coupling of the anodes of the photomultiplier tubes will be described in conjunction with the coincident portion of the scintillator system shown in FIG. 1.

The signal of pulse summation device 25 is preferably a resistive network or could be of other more sophisticated pulse summation devices.

Electrical signals obtained from the pulse summation device are then applied to a non-linear amplifier such as a logarithmic amplifier having a characteristic such that for a low amplitude input signal the gain of the amplifier is of one value and for a higher amplitude input signal the gain of the amplifier is smaller than the gain for a low input signal. In other words, the non-linear amplifier should have a characteristic curve E-out vs. E-in, wherein the curve preferably always has a positive slope. Preferably, the amplifier is also non-saturating for the expected energy levels encountered in liquid scintillation counting. It should also be understood that a linear logarithmic amplifier arrangement could also be utilized for purposes of this arrangement, as long as the characteristics of the amplifier is as defined above, although a logarithmic amplifier is preferred in this invention because of the expected range of signals to be amplified.

By the use of the logarithmic amplifier described above, double or dual label experiments utilizing isotopes having widely divergent energy spectrums, can be performed without encountering the adverse effects of amplifier saturation, thus losing count information with regard to beta decay events. Further, the use of this type of non-linear amplifier greatly simplifies and reduces the cost of prior art scintillation counting systems, wherein a separate attenuator had to be utilized in each of the channels of a dual label scintillation system together with separate linear amplifiers in each of the channels of the system. Accordingly, by the use of non-linear amplification, isotopes having wide beta decay energy spreads can be investigated simultaneously.

In order to reduce the effects of the inherent random noise generated in the photomultiplier tubes, a coincident device 35 is provided for permitting only legitimate beta decay events to be received by the analysis portion of the scintillator system. In the preferred embodiment, the coincident device 35 comprises two trigger circuits 36 and 37 which are coupled to a coincident gate 38 which, in turn, is coupled to a linear gate 39 connected to the logarithmic amplifier 30. The trigger circuits 36 and 37 are coupled via lines 41 and 42 to the anodes of photomultiplier tubes 22 and 23, respectively. On the reception of a signal by both trigger circuits 36 and 37, a signal is provided to the coincident gate 38 thereby providing a signal to actuate the linear gate 39. Upon receipt of this signal, linear gate 39 will permit the analog signal representing the amplitude of the beta decay event to be transmitted to the analysis section of the scintillator system. For the purposes of this invention, a linear gate is one providing an output signal which is proportional to the input signal. This is in contrast to the non-linear AND gate wherein the output signal amplitude is independent of the input signal amplitude. If a signal is erroneously detected over line 41 and applied to trigger circuit 36 without a similar signal being detected by photomultiplier tube 23, the coincident gate will not close, thereby not permitting an illegitimate signal, generally related to the noise in one of the phototubes, to enter the analysis portion of the system. After the legitimate signal is passed through the coincident device 35, it is applied simultaneously to two separate analysis channels, 43 and 44. These channels generally include pulse height analyzers 45 and 47, which include discriminators for permitting only pulses or signals of predetermined amplitude ranges to be counted in a suitable scaler and/or counter 46 and 48. By the use of two pulse height analyzers 45 and 47, each of which is set to permit only pulses of different amplitudes to be detected, signals indicative of beta decay events of low level isotopes such as tritium may be separated from signals indicative of the energy decay from high level isotopes such as phosphorous $P^{32}$. The pulse height analyzers 45 and 47 are, in essence, of the window type and operate generally in an anti-coincident manner, such that if a signal is detected having an amplitude greater than a certain amount, the signal will not be permitted to pass from the analyzer and be counted in the scaler and/or counter. Examples of suitable pulse height analyzers are disclosed in the text "Nuclear Pulse Spectrometry" by Robert L. Chase, published by McGraw-Hill Book Company in 1961, particularly in chapters 3 and 4.

The scalers and/or counters could be of the general multi-purpose counter type as long as their responses are in the same order of magnitude as the pule rate expected in the system. Ring counters or conventional binary coded decimal counters may be utilized in conjunction with scaling devices such as binary devices which are essentially dividers. In order to present the data indicative of the counts obtained during the investigation of the sample by the scintillation counting system, suitable devices such as electro-luminescent data presentation systems or numerical digital read-out systems and, further, magnetic tape punch card or print-out type systems could be combined with the scaler and/or counter to provide a record of the counts obtained in the counter. Thus, with the scintillation system disclosed in FIG. 1, a dual label experiment can be accomplished without the necessary prior art requirements of separate attenuators and amplifiers. Additionally, with the system disclosed in FIG. 1, only legitimate decay events are permitted to be analyzed, thus preventing the loss of counts due to the slow response of available pulse height analyzers.

Figure 2:
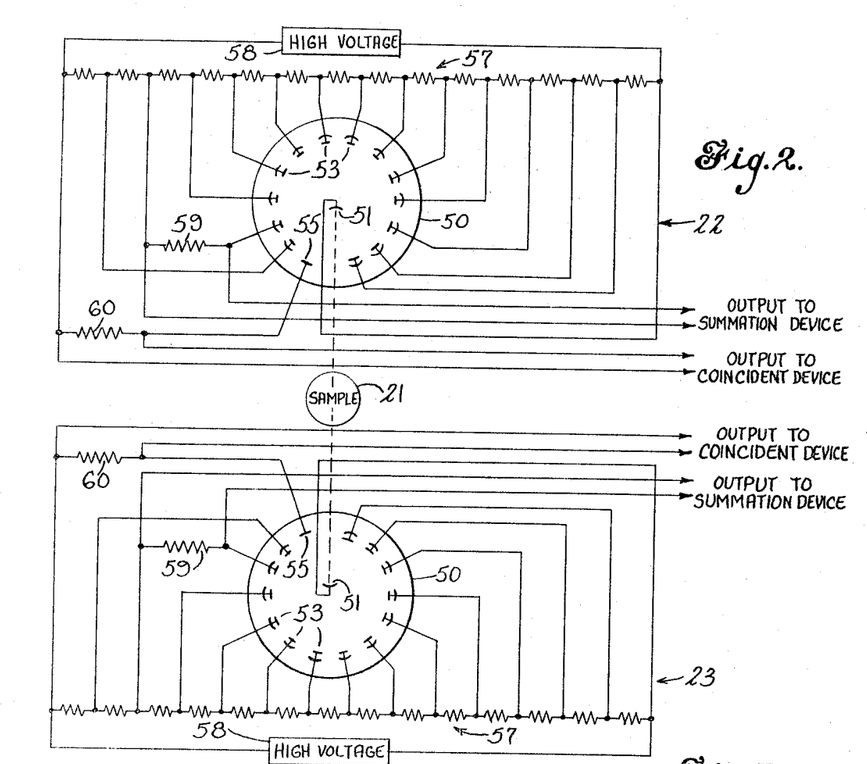
FIG. 2 is a schematic diagram showing the connection of photomultiplier tubes according to this invention.

Referring now to FIG. 2, there is shown the schematic details of a typical photomultiplier tube arrangement for use in the block diagram of FIG. 1. The photomultiplier tubes 22 and 23 generally include an envelope 50, a photocathode 51 for receiving photons from sample 21, a plurality of dynodes generally shown at 53 for amplifying the signals received by the photocathode, and an anode 55. The cathode 51, the dynode 53 and the anode 55 are all coupled across the resistive arrangement 57 which is, in turn, coupled to a high voltage source 58. An output signal which is fed into the summation device 25 is obtained across the resistor 59 and an output signal, which is fed into the coincidence device 35 is obtained across a resistor 60, thus isolating the summation and amplification portion of the system from the coincidence portion of the system. In this manner, system cross-coupling and noise effects are greatly diminished.

Figures 3, 4:
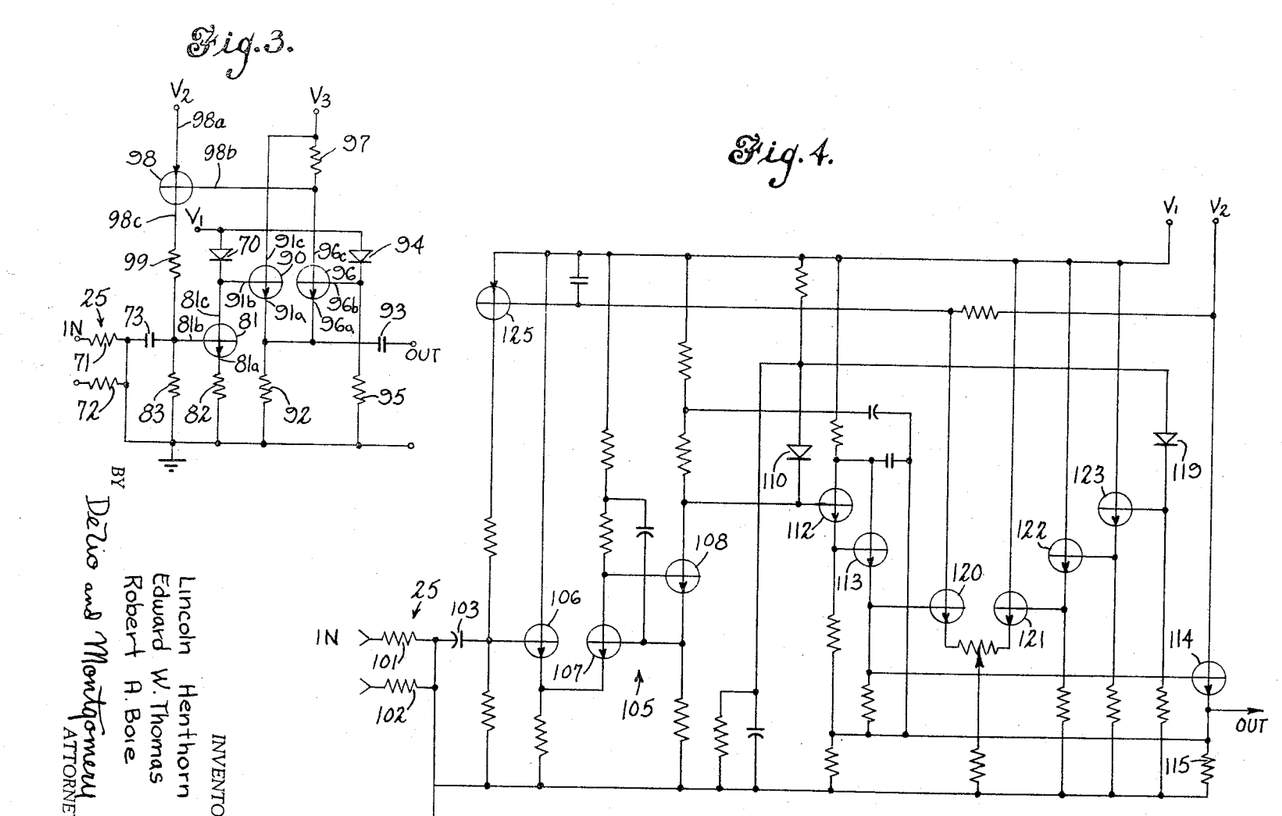
FIG. 3 is a schematic diagram of a typical logarithmic amplifier for use in FIG. 1.
FIG. 4 is a schematic diagram of an alternate embodiment of a non-linear logarithmic amplifier suitable for use in FIG. 1.

Referring now to FIG. 3, there is disclosed a non-linear amplifier of the logarithmic type, preferably having the characteristic where E-out is equal to $K \log_x E$-in, wherein K is a constant and X is a number greater than 1. This characteristic is obtained by the use of a diode, preferably a planar epitaxial diode such as, for example, a 1-N-4009, which is generally shown at 70. The input to the circuit of FIG. 3, generally shown as the pulse summation circuit 25, includes two parallel resistors 71 and 72 which are coupled to the dynodes of the respective photomultiplier tubes 22 and 23. These input signals are then coupled through input capacitor 73 to a first transistor 81 having an emitter 81a, base 81b and a collector 81c. Coupled to emitter 81a is an emitter current-limiting resistor 82, and coupled to base 81b is an input dropping resistor 83. Coupled to collector 81c is the logarithmic diode 70 which is, in turn, coupled to a source of voltage $V_1$. Transistor 81 acts to keep the D.C. bias current through the diode 70 constant. Since diode 70 has a logarithmic I–V characteristic, input signals from input circuit 25 will cause the instantaneous current through diode 70 to change because of a change of base bias of transistor 81 and, therefore, provides a change in voltage in accordance with the change in current across diode 70. This change in voltage is then applied across an emitter follower transistor 90 having an emitter 91a, base 91b and a collector 91c. The emitter 91a is connected to an emitter load resistor 92 which is in turn coupled to an output coupling capacitor 93 for permitting the voltage change to be applied to the next portion of the system.

In order to keep the average D.C. current through logarithmic diode 70 constant at high input signal pulse rates, a reference diode 94 is provided which has the same I–V characteristic as diode 70. The diode 94 is D.C. biased with the same current flowing through diode 70. This is accomplished by the connection of a current limiting resistor 95 between diode 94 and ground and the coupling of the other side of diode 94 to the input voltage source $V_1$. By utilizing a transistor 96 having an emitter 96a, base 96b and collector 96c in a feedback loop to sense the voltage drop across the reference diode 94 and at the same time comparing this signal with the voltage sensed by the emitter follower transistor 90 across the logarithmic diode 70 and applying these two signals across a differential resistor 97, the difference in voltage across the two diodes 70 and 94 is determined. This difference voltage is then applied to a transistor 98 having an emitter 98a, base 98b and collector 98c. The transistor 98 is connected to a voltage source such that the voltage drop across it will vary in accordance with the difference of voltage detected across resistor 97. This signal is then applied to a resistor 99 which is coupled to the base 81b of transistor 81 to adjust the average current in the log diode, such that the average current in the log diode is maintained equal to the current in the reference diode and substantially independent of the pulse rate of the incoming signals.

Referring now to FIG. 4, there is shown an alternative embodiment of a logarithmic amplifier suitable for use in the block diagram of FIG. 1. The input to the circuit of FIG. 4 includes the pulse summation network 25 comprising two parallel connected resistors 101 and 102. These resistors are coupled through an input capacitor 103 to a constant current source generally shown at 105. This constant current source comprises three transistors 106, 107 and 108. Transistors 106 and 107 are coupled in a differential manner so as to keep the gain between the input to 106 and the output of 108 equal to a constant regardless of the beta of the transistors. Coupled to the current source is a diode 110 having a logarithmic I–V response characteristic. The quiescent D.C. current flowing through diode 110 is held constant by the current source 105. The output voltage drop across diode 110 is obtained across a Darlington connected pair of transistors 112 and 113 and applied to a transistor 114 to thus obtain an output signal across output resistor 115. This signal is representative of the instantaneous change in current passing through the diode 110 as a result of the input signals applied through the pulse summation network 25.

A reference diode 119 is also included in this network to provide a means for maintaining the average current in the diode 112 constant. With mono-polar pulses, the quiescent operating point will change, since the mono-polar pulse current effectively changes the average current used to bias the diode 112. In effect, the bias current changes with rate. This effect is overcome by establishing a reference current through a reference diode and comparing its voltage drop with that of the logarithmic diode. To accomplish this, a differential transistor network comprising transistors 120, 121, 122 and 123, is coupled as shown in the figure to obtain a voltage drop which is proportional to the difference in voltage across the diodes 110 and 119. This difference signal is then applied to transistor 125 to control the base current applied to the current source transistors 106, 107 and 108. In this manner, the average current through diode 110 is held constant.

It is to be understood that other types of logarithmic amplifiers may be utilized in this invention. Furthermore, an amplifier having a linear logarithmic characteristic may also be utilized, although the logarithmic characteristic, particularly the logarithmic characteristic obtained with a diode, is preferred. Since the most commonly utilized isotopes are $H^3$, $C^{14}$ and $P^{32}$ and their pulses or signals differ in amplitude such that they are a decade apart, a diode having substantially a true logarithmic characteristic is preferable. This relationship between energy levels of the isotopes was previously noted, wherein an $H^3$ energy event was described as giving rise to possibly 40 photons, a $C^{14}$ event as giving rise to approximately 400 photons and a $P^{32}$ event as giving rise to approximately a peak of 12,000 photons. Accordingly, in a dual label experiment utilizing the isotopes $H^3$ and $C^{14}$, the amplitude of the maximum or the average pulses will generally be separated by at least a decade.

Figure 5:
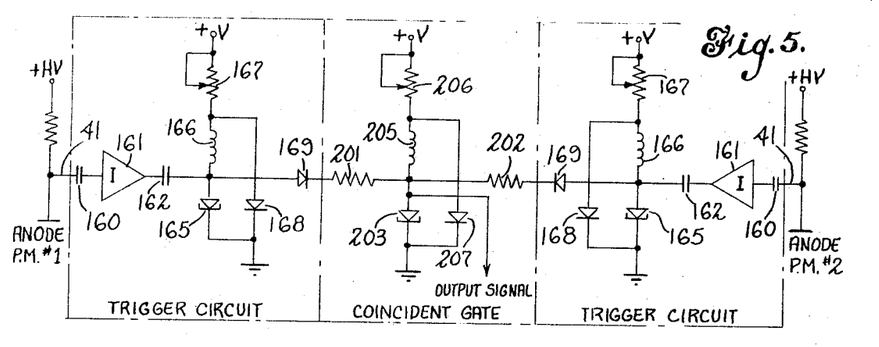
FIG. 5 is a schematic diagram of a suitable trigger circuit and coincident gate for use in FIG. 1.

Referring now to FIG. 5, there is disclosed a tunnel diode circuit which is suitable for use as trigger circuits 36 and 37 and the coincident gate 38 shown in FIG. 1. The trigger circuits 36 and 37 could comprise, as disclosed in this figure, an isolating input capacitor 160 which is coupled to an ineverter 161. This couples the signals from the anodes of photomultiplier tubes 22 and 23 to the tunnel diode shown at 165. Tunnel diode 165 is D.C. biased by a biasing resistor 167, such that it is operating on one portion of the positive sloped knee of its negative resistance characteristic curve. Upon the presence of an input signal pulse from the anode of the photomultiplier tube, the diode switches to the other positive sloped knee of its negative resistance characteristic curve. This results in a voltage change across tunnel diode 165 which is transmitted via diode 169 to the coincident gate 38. Tunnel diode 165 switches back to its original quiescent D.C. condition due to the charge and discharge of an inductor 166 which, when combined with diode 168, returns tunnel diode 165 to its original D.C. bias condition.

The coincident gate portion of FIG. 5 is essentially an "and" circuit and includes two input resistors 201 and 202 coupled to trigger circuits 36 and 37, respectively. The coincident gate 38 also includes a tunnel diode 203 which is biased such that signals from both trigger circuits 36 and 37 are required in order to trigger it. The tunnel diode 203 is D.C. biased by current limiting resistor 206, such that it is quiescently operating at one positive sloped knee of the negative resistance characteristic curve. The diode 203 is caused to switch to its other stable knee portion of the tunnel diode characteristic by coincident signals from both trigger circuits 36 and 37. The diode 203 is switched back to its initial state by the action of the inductor 205 and diode 207. By adjusting the bias applied to the tunnel diodes in the trigger circuits 36 and 37, it is possible to adjust the coincidence resolving time of coincident gate 38.

Figure 6:
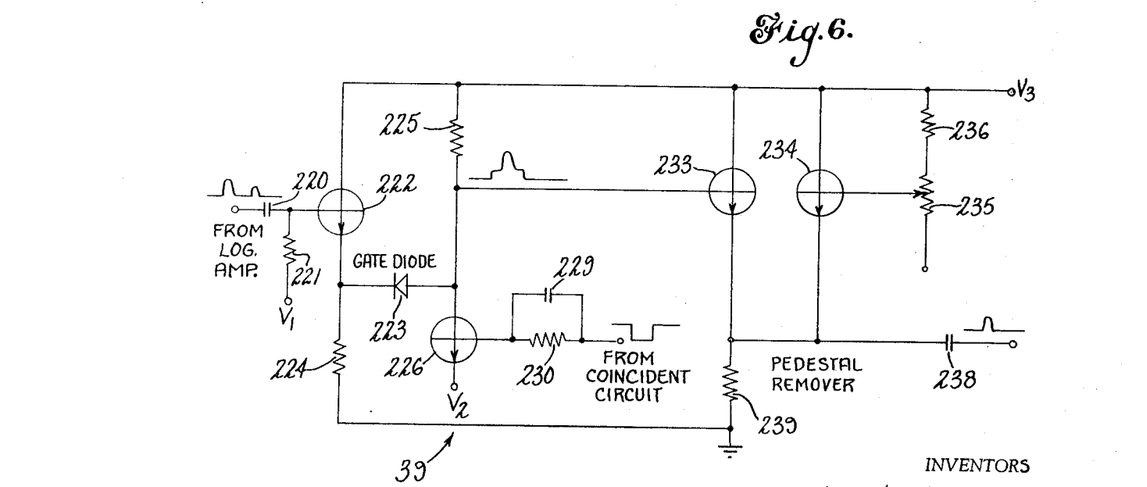
FIG. 6 is a schematic diagram of a linear gate suitable for use in FIG. 1.

Referring now to FIG. 6, there is disclosed a schematic diagram of a linear gate suitable for use as the linear gate 39 of FIG. 1. The linear gate comprises an input capacitor 220 and resistor 221 which couples input signals from the logarithmic amplifier 30 to a first transistor 222. This transistor is connected in an emitter follower fashion to diode 223 which is, in turn, coupled to a collector of a transistor 226. This transistor is coupled through an input capacitor resistor network 229 and 230 to the coincident gate circuit 38. In the presence of a signal from coincident gate 38, transistor 226 is cut off, thus turning on the diode 223. In the presence of a signal from the log amplifier, an output signal as shown will be obtained from the collector of transistor 226. This signal will contain a pedestal which is removed by a pair of transistors 233 and 234 which act as a pedestal remover. An output signal is then obtained from capacitor 238, as shown in the drawing.

It is to be understood that other linear gate arrangements, such as a relay, will act the same but, in the particular use to which the linear gate is applied, the circuit shown in FIG. 6 is preferred because of its speed of response.

Figure 7:
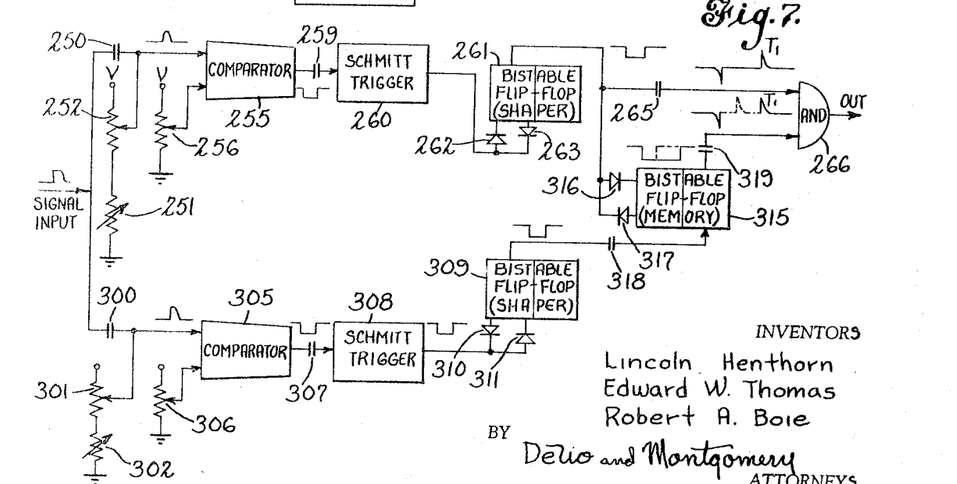
FIG. 7 shows a logical block diagram, partially in schematic, of a pulse height amplifier suitable for use in the scintillator system of FIG. 1.

In FIG. 7 there is disclosed a logical diagram, partially in schematic, of a pulse height analyzer which could be utilized in FIG. 1. In this figure, an input signal from the linear gate is applied to the pulse height analyzer through a capacitor 250. The input signal is then applied to a signal comparator 255. One input of the comparator is D.C. biased by variable resistors 251 and 252. The other input of the comparator is D.C. biased by a variable resistor 256. By setting the adjustment of resistors 251, 252 and 256, a differential output signal will be obtained whenever the input signal exceeds a predetermined level. A suitable comparator could comprise a differential amplifier circuit or other suitable servo type comparators. The output signal is then applied to the input of a Schmidt trigger 260. This trigger turns on and off in accordance with the amplitude of the signal provided by comparator 255. The output of the Schmidt trigger is a pulse having a pulse width which is related to the amplitude of the input signal. The output of the trigger is then coupled to a bi-stable flip-flop pulse shaper 261 having an input circuit comprising diodes 262 and 263. By using two oppositely connected and biased diodes coupled to one half of the flip-flop, the flip-flop will then turn on and off in accordance with the magnitude signal provided by the trigger. The output from the flip-flop 261 is then applied via coupling capacitor 264 to an AND circuit 266. The resultant signal is shown above the line from capacitor 265. It is noted that this signal has a negative-going blip and a positive-going blip which are spaced in accordance with the length of the pulse from flip-flop 261.

The input signal from the linear gate is also applied through a capacitor 300 to a second comparator 305. One input of the comparator amplifier is coupled to two variable resistors 301 and 302 which alter the bias applied to the input of one side of comparator 305. The other side of the comparator is also biased by a variable resistor 306. By setting or varying resistor 302, a difference signal may be obtained whenever the input signal is greater than a predetermined amount. The output from comparator 305 is coupled through coupling capacitor 307 to a Schmidt trigger 308. This trigger is then coupled to a bi-stable flip-flop pulse shaper 309 having multiple input diodes 310 and 311 which turn on and off one half of the flip-flop in accordance with the signal provided by the Schmidt trigger 308. The output from flip-flop 309 is coupled via coupling capacitor 318 to a bi-stable flip-flop 315 which acts as a memory device. The output from bi-stable flip-flop 261, previously mentioned, is also applied to the other side of bi-stable flip-flop 315 via diodes 316 and 317. The output signal from memory flip-flop 315 is then coupled through coupling capacitor 319 to the AND circuit 266.

If it is assumed that the first comparator 255 is biased such that a difference signal will be provided from it only if the input signal is greater than a voltage $V_1$ and if it is assumed that comparator 305 will only provide an output signal when the input signal to it is greater than a voltage $V_2$ where $V_2$ is greater than $V_1$ then, for all signals less than $V_2$, bi-stable flip-flop 309 will not provide a signal and the signal from bi-stable flip-flop 261 will cause flip-flop 315 to change its state for a time interval determined by the pulse width of the signal from flip-flop 261 and will result in two blips (solid lined) shown above the line from capacitor 219 to the AND circuit 266. Since the AND circuit 266 is made to respond to only positive-going pulses, the two input signals to the AND circuit will be in coincidence and the output signal will be obtained from the AND circuit. If the input signal is greater than $V_1$ and $V_2$, a signal from flip-flop 261 will cause bi-stable flip-flop 315 to initially alter its state but it will be returned to its original state by a signal from flip-flop 261 returning the memory flip-flop 315 back to its original state. Therefore, an output pulse from flip-flop 315 will be provided as shown by the dotted lines and, accordingly, the positive-going blips will not be in timed coincidence and there will be no output signal from AND circuit 266. This is essentially what is known as a window or anti-coincident pulse height analyzer wherein only those signals falling between predetermined voltage ($V_1$ to $V_2$) levels provide an output signal, which may then be counted in a counter. As previously mentioned, there are many other pulse height analyzers which would be suitable for the purposes of this invention and, accordingly, it is desired that the scope of this invention not be limited with regard to the type of pulse height analyzer actually utilized, although the pulse height analyzer shown herein is preferred because of its speed of response and its simplicity.

Figure 8:
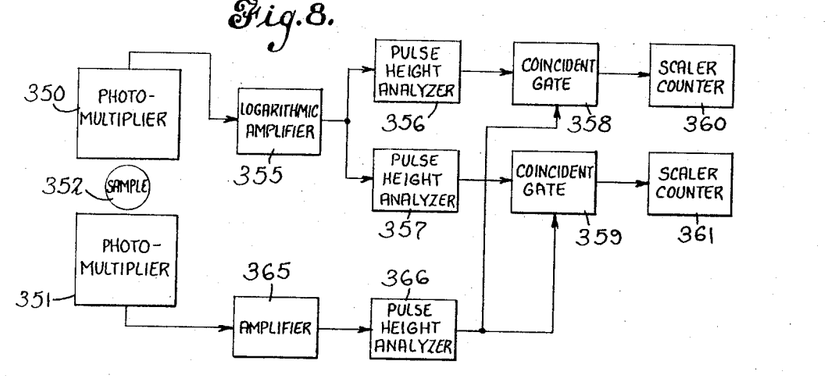
FIG. 8 is a block diagram of an unsymmetrical scintillator system utilizing the non-linear logarithmic amplifier according to this invention.

Referring now to FIG. 8, there is shown a block diagram of an unsymmetrical scintillator system utilizing the non-linear amplifier of this invention. In this figure, the non-linear amplifier is preferably of the logarithmic type as previously disclosed. The system shown in this figure includes two photomultiplier tubes 350 and 351, positioned to observe a sample and scintillator 352. The photomultiplier tube 350 is coupled to a logarithmic amplifier 355 which is, in turn, coupled to pulse height analyzers 356 and 357. The output from both the pulse height analyzers 356 and 357 are coupled to coincident gates 358 and 359, respectively, which are then in turn coupled to scaler and/or counters 360 and 361. Coincidence is obtained via a signal provided by photomultiplier 351 which is coupled to an amplifier 365 and pulse height analyzer 366. On the application of a signal to coincident gates 358 and 359, the output from pulse height analyzer 356 and 357 will be counted by the scaler and/or counters 360 and 361. Thus, by the use of a single amplifier 355 having preferably a logarithmic characteristic with a wide dynamic range extending over the voltage levels expected, an unsymmetrical system is now provided which avoids amplifier and analyzer signal overload.

Figure 9:
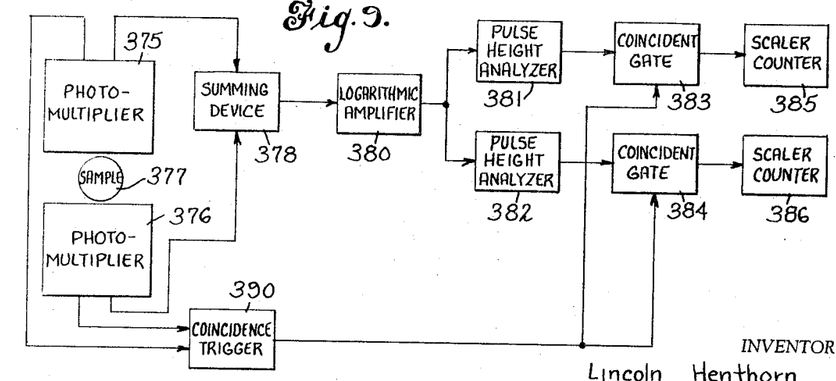
FIG. 9 is a block diagram of a symmetrical scintillator system utilizing the non-linear logarithmic amplifier according to this invention.

In FIG. 9 there is disclosed a scintillation measurement system incorporating non-linear amplification. This system comprises two photomultiplier tubes 375 and 376 which are positioned to detect light emanating from a sample and scintillator 377. The output from photomultipliers 375 and 376 are summed in a summing device 378 and then applied to a non-linear amplifier 380 such as a logarithmic amplifier having an I–V characteristic of a diode, previously described. The signal from the logarithmic amplifier is then applied to the usual pulse height analysis devices 381 and 382. The output from the pulse height analysis channels are then coupled to two coincident gates 383 and 384 to scaler-counters 385 and 386, respectively. Coincidence between signals received in both photomultipliers 375 and 376 are obtained by the use of a coincidence trigger 390 which is coupled to both coincident gates 383 and 384. Thus, by the use of a non-linear amplifier, preferably of the logarithmic type, a symmetrical system is provided not requiring attenuators in each of the channels in order to prevent overload of the amplifiers or the pulse height analyzers in the system. This is accomplished with a single amplifier having a predetermined characteristic, of a type which prevents overload and thus reduces the possibility of losing counts due to saturation of various devices in the system.

It is to be understood that the principles of this invention may be applied to the measurement of other types of radioactivity, such as, for example, gamma and alpha radiation. To measure gamma radiation, the radiation energy emitted from a gamma source may be converted by way of the Comptom effect into light scintillations which may then be analyzed and counted as described herein. Alpha radiation may also be detected in a similar manner or even directly by use of an ionization chamber.

It will thus be seen that the objects set forth above, among those made apparent from the preceding description, are efficiently attained and, since certain changes may be made in the foregoing constructions and systems without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A system for measuring the energy of beta particle decay events from a source containing one or more radioactive isotopes, said system comprising in combination, means for converting the energy of each beta decay event into light energy signals proportional to the energy of each beta decay event, means for logarithmically amplifying and converting some of said light energy signals to electrical pulses, a plurality of signal discriminator channels for simultaneously receiving said electrical pulses, and means for gating said electrical pulses prior to their being received by said channels in response to said electrical pulses.

2. A spectrometer system comprising in combination, two energy converting means for providing electrical signals indicating the presence of detected light, means for logarithmically amplifying some of said electrical signals, means for gating at least some of said electrical signals in accordance with coincident electrical signals provided from each of said energy converting means, and a plurality of signal amplitude analysis channel means for receiving said gated electrical signals.

3. A system for measuring the energy of beta particle decay events from a source containing one or more isotopes, said system comprising in combination, means for converting the energy of each beta decay event into light energy, two means for converting the light energy produced into electrical pulses proportional in amplitude to the energy of the corresponding decay events, means for adding said electrical pulses from each of said two means, means for logarithmically amplifying some of said added pulses, means for linearly coincident gating said amplified pulses in response to electrical pulses from each of said means for converting, and a plurality of pulse analyzing channel means for receiving said gated amplified pulses.

4. A system in accordance with claim 3, wherein each of said channels are set to discriminate between pulses of different energy levels and wherein the number of said discriminated pulses are counted.

5. In combination, a first photomultiplier tube, a second photomultiplier tube, a signal adding device coupled to each of said tubes, a logarithmic pulse amplifier coupled to said signal adding device, a linear coincident gate coupled to said tubes and to said amplifier, and a plurality of signal amplitude analyzing means, each of said last-mentioned means coupled to said gate.

6. An unsymmetrical scintillation system for measuring the activity levels of sources each containing one or more isotopes undergoing a plurality of energy decay events resulting in the emission of a plurality of beta particles, said system comprising in combination, means for converting the energy of said beta decay events into light energy, two means for converting said light energy into electrical signals, means for non-linearly amplifying said electrical signals from one of said two means, said means for amplifying having a positive sloped gain characteristic, a plurality of signal analysis channels for receiving said amplified signals, means in each of said channels for performing predetermined amplitude discrimination of said signals, and means in each of said channels for gating said discriminated signals in accordance with signals received from the other of said two means for converting said light energy.

7. A system in accordance with claim 6, wherein said amplifying means has a logarithmic gain characteristic.

8. A system in accordance with claim 7, including means in each of said channels for counting only those discriminated signals which are gated.

9. A symmetrical scintillation system for measuring the activity levels of sources, each containing a plurality of isotopes undergoing a plurality of energy decay events resulting in the emission of a plurality of beta particles, said system comprising in combination, means for converting the energy of said beta decay events into light energy, a plurality of means for converting said light energy into electrical pulse signals, means for summing said electrical pulse signals from said plurality of means for converting said light energy, means for non-linearly amplifying some of said summed electrical pulse signals, said means for amplifying having a positive sloped gain characteristic, a plurality of signal analysis channels for receiving said amplified signals, means in each of said channels for performing predetermined amplitude discrimination of said signals, and means in each of said channels for coincidence gating said discriminated signals in accordance with said electrical signals received from a plurality of means for converting said light energy into electrical pulse signals.

10. A system in accordance with claim 9, wherein said amplifying means has a logarithmic gain characteristic.

11. A system in accordance with claim 10, including means in each of said channels for counting only those discriminated signals which are coincidence gated.

12. A signal amplitude analyzer comprising an combination, means for comparing an input signal with a first reference signal to provide a first signal, means for comparing said input signal with a second reference signal to provide a second signal, memory means responsive to said first and second signals for providing a third signal, and means responsive to both said first and third signals for providing an output signal only when said first and third signals are in coincidence.

13. A spectrometer apparatus for measuring the activity levels of N isotopes with each of said isotopes undergoing a plurality of different energy decay events resulting in the emission of a plurality of beta particles and with each isotope being uniquely identified by its energy spectrum, the combination comprising means for converting the energy of each beta decay event into light energy, means for converting the light energy produced into electrical pulses logarithmically proportional to the amplitude of the corresponding decay event, N analyzing channels for simultaneously receiving said electrical pulses, each of said channels including a discriminator means for passing only a preselected amplitude band of pulses therethrough, and means for separately counting the pulses passed through each of said channels, said discriminator means being preset so that each of said N isotopes are counted in a different corresponding one of said channels.

14. A spectrometer apparatus for measuring the activity levels of N isotopes with each of said isotopes undergoing a plurality of different energy decay events resulting in the emission of a plurality of beta particles, and with each isotope being identifiable by its energy spectrum, the combination comprising means for converting the energy of each beta decay event into light energy, means for converting the light energy produced into electrical pulses logarithmically proportional in amplitude to the energy of the corresponding decay event, and a plurality of pulse discriminating channels for detecting selected electrical pulses in accordance with their amplitude.

15. A scintillation measurement system comprising in combination, a plurality of energy converting means for providing electrical signals indicating the reception of impinging light by said energy converting means, means for combining the electrical signals provided by said energy converting means, and means for linearly gating said electrical signal in response to the presence of coincident electrical signals provided from each of said energy converting means.

16. In a measurement system for detecting light impulses, two photomultiplier tubes for detecting said impulses and converting said impulses into electrical energy proportional to the amplitude of said impulses, said photomultipliers each comprising a plurality of dynodes and at least one anode, means for combining electrical signals from a dynode of each of said photomultipliers, and means for gating said combined signals in accordance with the coincidence of signals obtained from an anode of each of said photomultipliers.

References Cited by the Examiner

UNITED STATES PATENTS

| | | | |
|---|---|---|---|
| 2,454,871 | 11/1948 | Gunderson | 250—207 |
| 2,892,091 | 6/1959 | Sawle | 250—83.3 X |
| 2,922,886 | 1/1960 | Putnam | 250—71.5 |
| 2,994,781 | 8/1961 | Brooks | 250—71.5 X |
| 3,069,545 | 12/1962 | Lide et al. | 250—83.1 |
| 3,071,689 | 1/1963 | Scherbatskoy | 250—71.5 X |
| 3,114,835 | 12/1963 | Packard | 250—106 X |
| 3,204,129 | 8/1965 | Kaenel | 307—88.5 |
| 3,217,180 | 11/1965 | Bergman | 307—88.5 |

ARCHIE R. BORCHELT, *Primary Examiner.*

RALPH G. NILSON, *Examiner.*